R. C. FRAMPTON.
INSTANTANEOUS WATER HEATER.
APPLICATION FILED APR. 7, 1910.
1,053,906.
Patented Feb. 18, 1913.
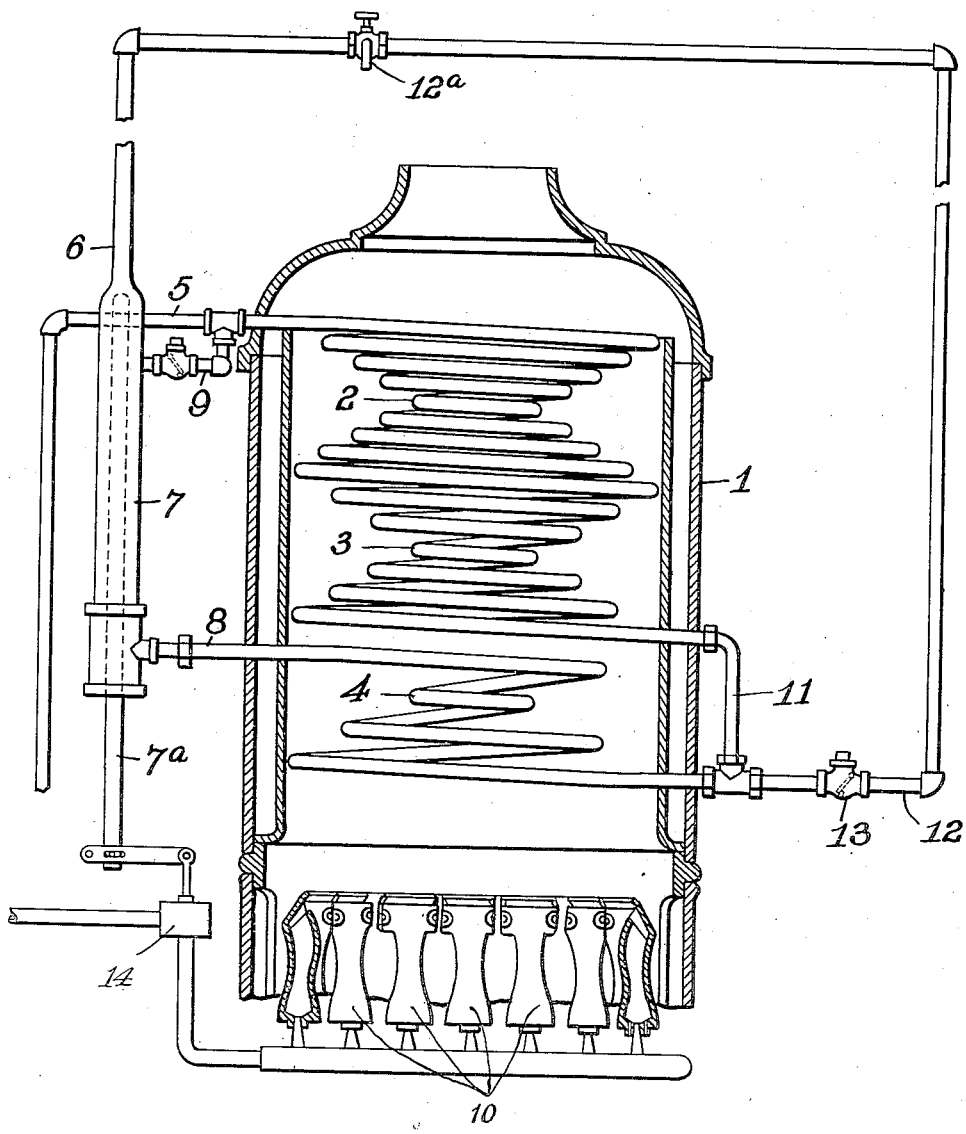

UNITED STATES PATENT OFFICE.

REYNOLDS C. FRAMPTON, OF PITTSBURGH, PENNSYLVANIA, ASSIGNOR TO PITTSBURG WATER HEATER COMPANY, OF ALLEGHENY, PENNSYLVANIA, A CORPORATION OF NEW JERSEY.

INSTANTANEOUS WATER-HEATER.

1,053,906.  Specification of Letters Patent.  Patented Feb. 18, 1913.

Original application filed November 6, 1907, Serial No. 400,905. Divided and this application filed April 7, 1910. Serial No. 554,022.

*To all whom it may concern:*

Be it known that I, REYNOLDS C. FRAMPTON, a citizen of the United States, residing at Pittsburgh, in the county of Allegheny and State of Pennsylvania, have invented certain new and useful Improvements in Instantaneous Water-Heaters, of which the following is a specification.

The invention relates to instantaneous water heaters employing coil tubes, the present application being a division of my application, Serial No. 400,905, filed Nov. 6, 1907, and now issued as Patent 973,646 of October 25th, 1910. It has for its primary objects; the provision of a heater having an improved continuous circulation system so arranged that the hottest water in the heater is made to continuously circulate past the controlling thermostat when the outlet is closed; the provision of a heater of the character specified in which the continuous circulation occurs through only a portion of the coils of the heater; and the provision of a heater having an improved arrangement for maintaining a constant circulation of hot water through the supply pipes to the end that hot water be instantly supplied upon opening a faucet. One embodiment of the invention is illustrated in the accompanying drawing wherein, The figure is a transverse section through the casing of type of heater, the heating coils being shown in side elevation.

Only one form of heater is illustrated, but it will be understood that the invention is regarded as of wide application. The heater shown is of the instantaneous type employing the usual water valve and thermostat for controlling the supply of fuel to the burners, such general type being shown in the patent to Reinecke No. 866,966 issued Sept. 24, 1907. Only so much of the heater construction is shown as is necessary to an understanding of the invention by those skilled in the art, the controlling water valve, the gas valve and the connections thereto from the water valve and thermostat not being illustrated. Referring briefly to the general construction as shown in the drawing, 1 is the casing of the heater which may be of any approved type; 2, 3 and 4 are the coil formations constituting the main portion of the heater; 5 is the inlet pipe leading into the upper coil formation 2; 6 is the outlet from the thermostat casing; 7 is the thermostat casing; 7ª is the thermostat which may be connected operatively to the gas valve 14 in any approved manner; 8 is the pipe leading from the lower portion of the boiler to the thermostat casing; 9 is a connection between the thermostat casing and the pipe 5 which connection is provided with a check valve; 10 are the burners; 11 is a detachable coupling or connection between the coil formations 3 and 4; 12 is the return circulation pipe to which the usual outlet faucets are applied, one only of which, 12ª, is shown; and 13 is a check valve for preventing a back flow of water to the right in the pipe 12.

The operation is as follows: When the faucets in the pipe 12 are closed and only the pilot valve is lighted or the other burners are running low, the coil 4 absorbs substantially all of the heat, and by reason of the fact that the pipes 8 and 12 are connected at different levels to the coil formation 4, an upward circulation through such coil formation is secured, and such movement of the water furnishes a continuous circulation through the thermostat casing 7 and the pipe 12. A certain amount of water is also circulated through the pipe 9 and coil formations 2 and 3. If the faucet 12ª is opened, a back flow through the pipes 9 and 12 is prevented by the check valve 13, and the incoming cold water passes through the pipe 5 the coil formations 2, 3 and 4, the thermostat casing 7 and the pipe 12 to the faucet 12ª.

The advantages and functions incident to the use of the circulation pipe 12, I regard as important. In the first place, it will be noted, that the arrangement provides for a continuous circulation through the thermostat casing when the outlet faucets are closed, so that the thermostat is governed by the hottest water at such time, and this circulation occurs regardless of the connection 9 and the check valve carried thereby. Danger of any damage to the heater is thus eliminated even though the pipe 9 should become choked or the check valve refuse to move freely, and in fact a safe and efficient system would still be maintained with such connection and check valve removed.

In the second place the system insures an immediate supply of the hottest water to the outlet faucets. When the burners are running low or only a single one burning, as is the case when the outlet faucets are closed, substantially all the heat is absorbed by the coil 4, so that a circulation through this coil is all that is necessary in order to give the water in the pipe 12 a proper amount of heat. It follows that the water thus circulated is much hotter than would be the case if all of the water in the heater circulated through the pipe 12 as the amount of heat absorbed in both cases would be substantially the same while the volume of water in the coil 4 is only a fraction of that of the entire heater. The frictional resistance is also much less and the circulation correspondingly more free than if the water circulated through all the coils of the heater.

It will be obvious that the invention is not limited to the arrangement shown, as the invention is capable of embodiment in widely different forms of apparatus. In so far as the return circulation feature is concerned whereby the hottest water is always available at the faucets, the one essential feature of the invention is that the circulation occurs through a portion only of the coils of the heater (and this portion the portion best heated by the burners), as opposed to a circulation through all of the coils of the heater. In so far as the safety and regulation feature is concerned as involved in the provision of the continuous circulation of the water past the thermostat, the one essential feature is the connection of the thermostat casing to the coils of the heater at two different levels both below the top of the heater whereby a constant circulation of a portion only of the water in the heater past the thermostat, and this the hottest portion, is secured. As to this safety and regulating function, it will be seen that it is immaterial whether or not the connection 9 is employed, inasmuch as the pipes 6 and 12 provide for a circulation when the outlet from the heater is closed.

Having thus described my invention and illustrated its use, what I claim as new and desire to secure by Letters Patent is the following:—

1. The combination with a thermostat, of a coil tube heater having upper and lower sections and consisting of a continuous tube, a cold water inlet to the upper section, a connection from the lower end of the upper section to the lower end of the lower section, an outlet from the upper end of the lower section passing through the thermostat, and a return circulation pipe connected to the lower section below the outlet of such section.

2. The combination with a thermostat, of a coil tube heater having upper and lower sections and consisting of a continuous tube, a cold water inlet to the upper section, a connection from the lower end of the upper section to the lower end of the lower section, an outlet from the upper end of the lower section passing through the thermostat, a return circulation pipe connected to the lower section below the outlet of such section, and means for preventing a back flow through such return circulation pipe.

3. The combination with a thermostat, of a coil tube heater consisting of a continuous tube and having a cold water inlet to the upper end, an outlet from the lower end passing through the thermostat, a return circulation pipe connected to the heater intermediate its ends, and means for preventing a back flow through such return circulation pipe.

4. In combination in an instantaneous heater, a series of heating coils, arranged one above the other and consisting of a continuous tube, a cold water inlet to the upper heating coils, a burner, a thermostat casing, a thermostat therein for controlling the supply of fuel to the burner, and a pair of connections between separated points in the casing to the lower heating coils at different elevations so arranged that a continuous circulation is secured through only the thermostat casing and through the lower portion of the coils lying between the said connections.

5. In combination, a vertical coil tube heater comprising a continuous tube and having an upper set of coils and a set of coils below such upper set, a burner thereneath, a cold water inlet to the upper set of coils, a thermostat casing, a thermostat therein for controlling the supply of fuel to the burner, a connection extending from one portion of the casing to the upper portion of the lower set of coils, and a connection extending from another portion of the casing and leading into the lower portion of the lower set of coils, and arranged so that a continuous circulation is secured through the casing and the lower set of coils only lying between the said connections.

6. In combination, a vertical coil tube heater comprising a continuous tube and having an upper set of coils and a set of coils below such upper set, a burner thereneath, a cold water inlet to the upper set of coils, a thermostat casing, a thermostat therein for controlling the supply of fuel to the burner, a connection extending from one portion of the casing to the upper portion of the lower set of coils, and a connection extending from another portion of the casing and leading into the lower portion of the lower set of coils below such other connection whereby a continuous circulation system for the hottest water is provided through the lower coils of the heater only, and an outlet from such system.

7. In combination in an instantaneous heater, a series of upper heating coils arranged in a continuous series one above the other, a lower heating coil to which the lower end of the upper heating coil is attached and with which it communicates at such point of attachment, a cold water inlet to the upper heating coils, a thermostat casing, a burner, a thermostat in the said casing for controlling the supply of fuel to the burner, and a pair of connections between separated points in the casing to separated points in the lower heating coil, whereby a continuous circulation is secured through the thermostat casing and through only the lower heating coils.

In testimony whereof I have hereunto signed by name in the presence of the two subscribed witnesses.

REYNOLDS C. FRAMPTON.

Witnesses:
S. A. MYERS,
IDA MAY BLAINE.